Figure 1:
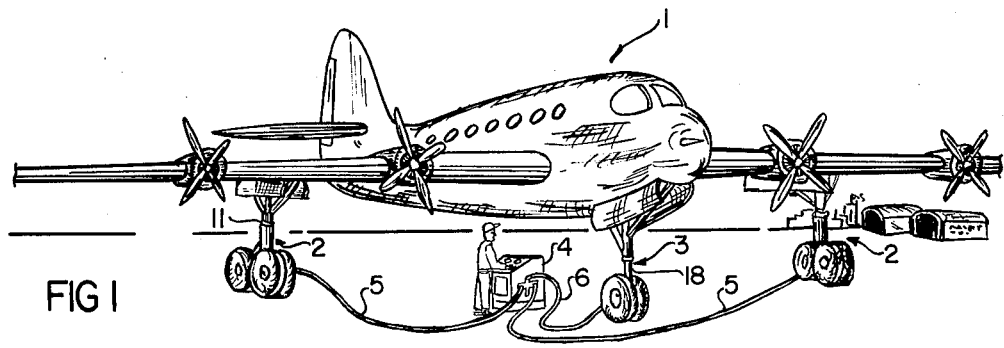

Aug. 31, 1965 W. B. WESTCOTT, JR., ETAL 3,203,234
AIRCRAFT WEIGHT AND CENTER OF GRAVITY DETERMINATION SYSTEM
Filed June 8, 1962 3 Sheets-Sheet 1

INVENTORS
WILLIAM B. WESTCOTT, JR.
BY WALLACE G. BOELKINS

Oberlin, Maky & Donnelly
ATTORNEYS

*INVENTORS*
*WILLIAM B. WESTCOTT, JR.*
*WALLACE G. BOELKINS*
BY
Oberlin, Maky & Donnelly
ATTORNEYS United States Patent Office  3,203,234
Patented Aug. 31, 1965

3,203,234
AIRCRAFT WEIGHT AND CENTER OF GRAVITY DETERMINATION SYSTEM
William B. Westcott, Jr., Cleveland Heights, Ohio, and Wallace G. Boelkins, Grand Rapids, Mich., assignors to Cleveland Pneumatic Industries, Inc., Cleveland, Ohio, a corporation of Ohio
Filed June 8, 1962, Ser. No. 201,143
14 Claims. (Cl. 73—141)

This invention relates as indicated to a system for weighing and determining the center of gravity of aircraft and, more particularly, to such a system in which weight-sensing components in the aircraft are employed.

It is well known that gross take-off weight and the location of the center of gravity, with respect to the mean aerodynamic chord of the wing, are critical factors in the safe and efficient operation of any aircraft and it must be further appreciated that the problem of measuring and calculating such information has been greatly aggravated by the trend to the use of larger and heavier aircraft. With such development of the industry, conventional weighing techniques have become increasingly inefficient and impractical, and it is therefore a primary object of the present invention to provide a new system capable of readily supplying this vital information with accuracy and reliability.

For obvious reasons, the use of weight-sensing components incorporated in the aircraft for true "on-the-line" weighing is extremely advantageous, and the new system of this type comprises, briefly, weight-sensing elements installed within each landing gear and ground-based means for measuring and indicating the aircraft weights thus sensed. The requirements for accuracy and reliability are, of course, extremely high and these must be met by the weight-sensing elements or components employed, so that the character and operating characteristics of the latter, in effect, determine whether or not the system is successful. It has, for example, been found that the sensing of the landing-gear oleo pressures cannot be reliably used to furnish accurate information as to the weight, since the seals in these units produce a heavy frictional load on the telescoping members and this loading introduces substantial errors in any attempts to use measurement of oleo pressure for the weight estimation. In this case, the requisite accuracy is not available; the use of available resistance-type strain gauges on the landing gear would, as another possible expedient, be mode accurate, but the inherent fragile nature of such devices precludes their use as a practical matter. In other words, it is not enough to have stability and convenience without accuracy or, on the other hand, accuracy without the durability needed in order for the system to be reliable under the expected conditions of use.

Another principal object of this invention is therefore to provide an aircraft weight and center of gravity determination system comprising very sensitive but very rugged sensor or transducer assemblies in the aircraft landing gear.

A related object is to provide an improved transducer assembly which can be used for the indicated purpose in all varieties of aircraft ranging, for example, in size and weight from small personal aircraft to the largest commercial and military aircraft in use.

A further object of the invention is to provide a system as noted which requires a minimum of installation effort, with no significant addition of weight, volume or complexity to the aircraft. It is also an object to provide such a system which is economical with respect both to initial cost and to expenses of operation and maintenance.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
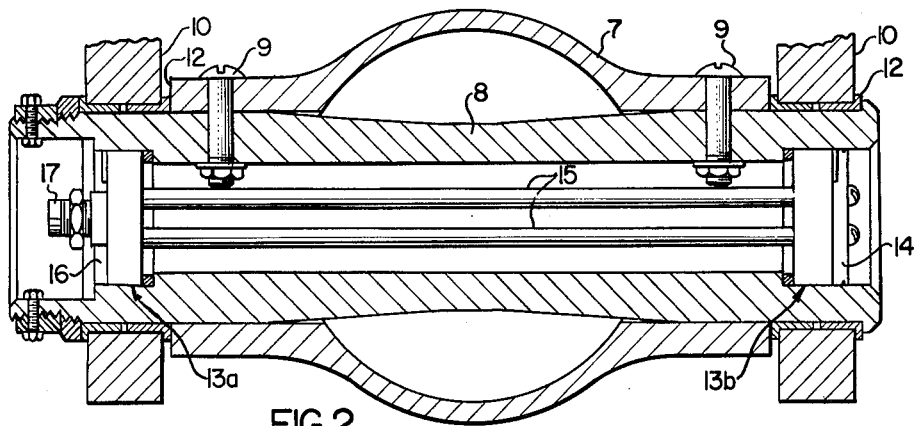
Figure 3:
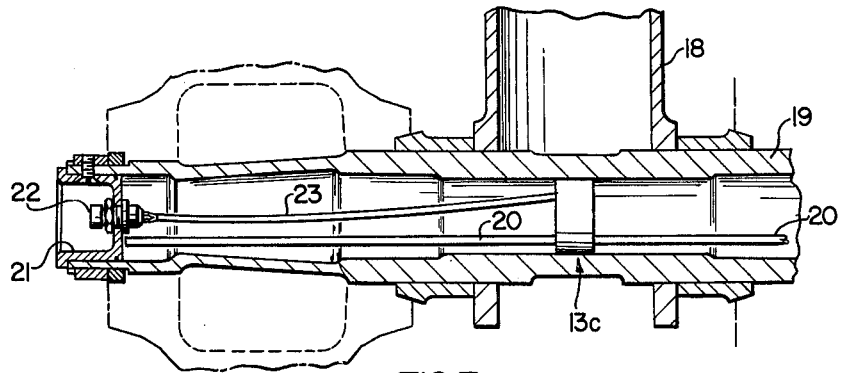
Figure 4:
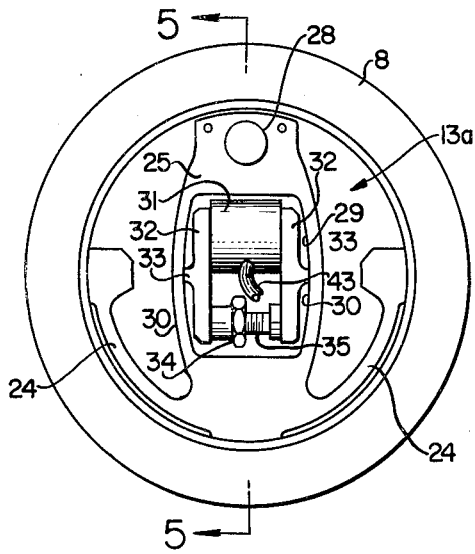
Figure 5:
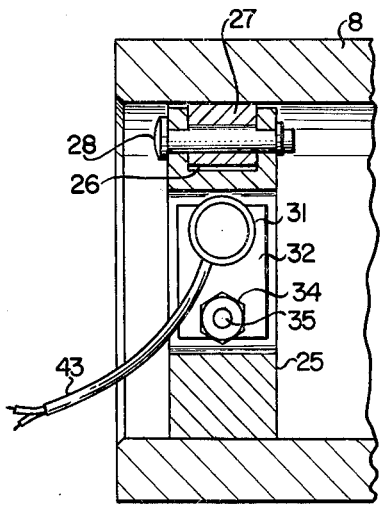
Figure 6:
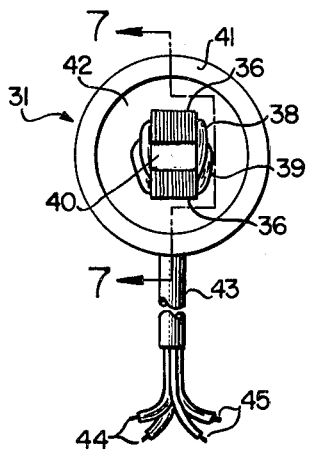
Figure 7:
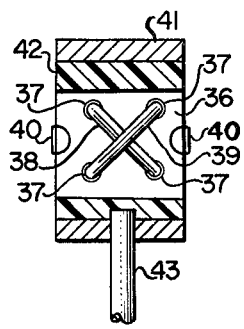
Figure 8:
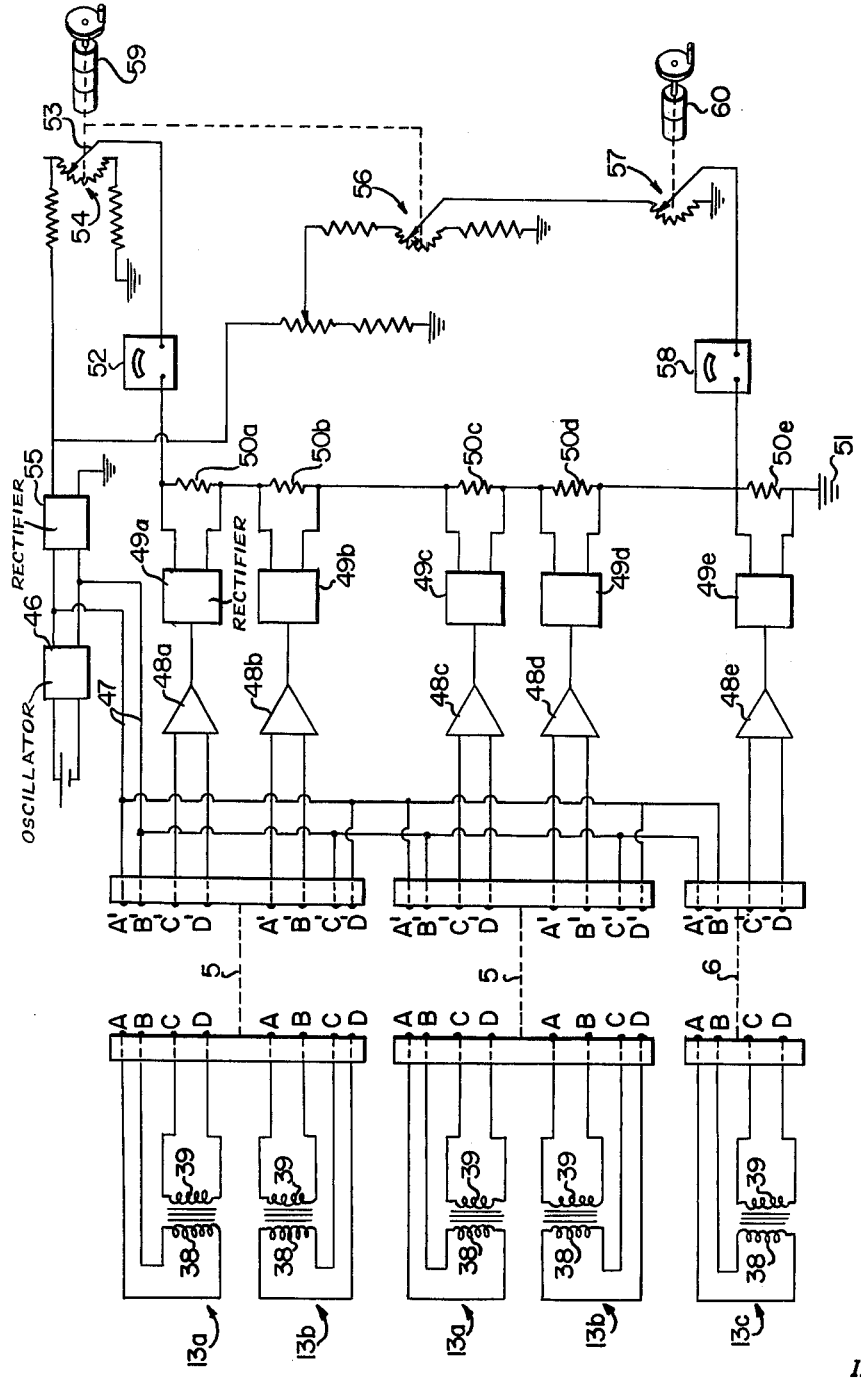

In said annexed drawings:
FIG. 1 is a perspective view of an aircraft being weighed by the system of the invention;
FIG. 2 is a longitudinal section of the bogie hinge pin in one of the main landing gear assemblies of the illustrated aircraft;
FIG. 3 is a fragmentary longitudinal section of the axle of the nose landing gear;
FIG. 4 is an enlarged end view of the hinge pin of FIG. 2, with the cap at such end removed to expose a transducer assembly in accordance with the invention therein;
FIG. 5 is a fragmentary sectional view the plane of which is indicated by the line 5—5 in FIG. 4;
FIG. 6 is an end view of one form of a sensing or transducing element used in the transducer assembly;
FIG. 7 is a sectional view of the element shown in FIG. 6 taken upon approximately on the plane indicated by the line 7—7 in the latter; and
FIG. 8 is a schematic diagram of a system in which the transducer elements are employed for measurement and indication of the aircraft weights.

Referring now to the drawings in detail, the aircraft designated generally by reference numeral 1 in FIG. 1 is representative of a conventional type of aircraft having two main landing gear assemblies 2 and a nose wheel assembly 3. It will be understood from the foregoing that we are particularly concerned with these landing gear assemblies and, furthermore, that even these units are conventional except to the extent of the modifications to be described in detail hereinafter in accordance with the invention. As a matter of fact, it is one of the noted objects of the invention to utilize as much of the existing structure wihout change as possible.

As will also appear more fully below, the new weighing and center of gravity determination system operates on electrical signals, and an operator is shown in FIG. 1 at a portable console 4 in which the ground circuits and components are housed. Cables 5 extend respectively from the two main landing gear assemblies 2 to the console, while a further cable 6 connects the console and the nose wheel assembly.

One of the main landing gear assemblies 2 is shown fragmented in FIG. 2 as comprising a bogie beam 7 and a hinge pin 8 extending transversely through the beam, the latter being locked in the former by means of bolts 9. The hinge pin projects at both sides of the beam, and the arms 10 of the usual bifurcated oleo strut 11 are respectively engaged on the projecting ends of the hinge pin 8, on suitable bearings 12, for the support and carriage of the beam 7. The strut 11 bears a portion of the total weight of the aircraft, with this load transferred through the hinge pin 8.

The hinge pin 8 is hollow, and transducer assemblies indicated generally by reference numerals 13a and 13b are respectively mounted transversely in slightly enlarged end portions of the pin. A seal 14 is secured against the outer side of the transducer assembly 13b at the right end of the pin, as viewed in FIG. 2, and a plurality of tie rods 15 extend between the assemblies through the hinge pin to draw the two together and thereby firmly hold them in place. A seal 16 is also disposed against the outer face of the other transducer assembly 13a, and an electric cable socket or connector 17 is mounted therein with leads extending interiorly to the two transducer assemblies. Both main landing gear assemblies 2 are formed and equipped as defined above, with the connectors 17 thereof adapted to receive the cables 5 leading to the console 4.

The nose wheel assembly 3 as shown in FIG. 3 comprises the usual piston 18 which here supports a hollow transverse axle 19 on which the wheels are mounted. A further transducer assembly 13c is disposed within the axle at the center of the same and is so positioned by tie rods 20 which extend respectively to end caps 21 secured in the ends of the axle 19. The end cap at the left, as viewed in this figure, supports a cable connector 22, adapted to receive the cable 6 to the console 4, and wires 23 extend from the connector to the inner transducer assembly 13c.

The same transducer assembly is employed at each of the locations noted, and it will therefore be sufficient to describe one in detail, with reference to FIGS. 4–7; the assembly 13a in the first two of these figures is shown mounted within a hinge pin 8. This assembly comprises a mount having a horseshoe shaped portion, which provides two curved spring arms 24 bearing against the inner surface of the hinge pin 8, and a diametrically extending cradle body portion 25. The mount is of fairly heavy construction, and it will be clear that the arms 24 serve properly to locate and hold the same within the hinge pin.

At the end of the cradle body 25 distant from the spring arms, a transverse slot 26 is provided and an adjusting block 27 is disposed in this slot. Such block has a curved outer face, and an eccentric adjusting screw 28 in the cradle body end passes through the block. The turning of the screw 28 causes the block 27 to move in and out with respect to the cradle body end.

An axially extending opening 29 is provided in the cradle body 25 with outwardly bowed side walls 30. A sensor or transducer element 31 is mounted in this opening between a pair of lever arms 32 at corresponding ends of the same. The arms 32 have outer center fulcrum portions 33 which bear against the cradle body walls 30, and an adjustable expansion device extends between the other ends of the arms 32. This expansion device comprises a nut 34 and a screw 35 threaded therein, and it will be seen that the turning of this nut will adjustably increase or decrease the separation of the removed ends of the arms 32 between which the transducer element 31 is clamped.

In the installation of the transducer assembly 13a, the eccentric adjusting screw 28 is actuated to force the block 27 outwardly against the interior of the hinge pin 8 and thus lock the assembly in place cooperably with the spring arms 24. The expansion device comprising the nut 34 and screw 35 is actuated to cause the outer center fulcrum portions 33 of the lever arms 32 to engage walls 30 and thereby apply a predetermined preload on the transducer 31. As aircraft "pay-load" is applied through the strut to the hinge pin 8, fosce is transmitted to these outwardly bowed walls 30 tending to move them apart, and this action relieves the preload on the transducer element 31. It will readily be appreciated that by employing this type of mount, the assembly is protected against damage due to hard landing or other unusual stress.

The transducer employed must, of course, be capable of proportionally translating force or stress into an electrical parameter. It must also be rugged, and the unit 31 illustrated in more detail in FIGS. 6 and 7 is one that has been found suitable. This unit is an electromagnetic load cell, comprising a laminated, grain orientated magnetic core 36 having four symmetrically arranged transverse holes 37 through the same. First and second electric coils 38 and 39 are respectively wound through diagonally opposite holes and they are therefore angularly related. Partially projecting inserts 40 are provided at the ends of the core 36, and a non-magnetic sleeve 41 surrounds the assembly in outward spaced relation, with the void therebetween filled with a suitable insulative potting compound 42. It will be apparent that in the sectional FIG. 7 view, the insulating compound has been removed more clearly to show the coils 38 and 39 and the inserts 40. A cable 43 passes through the sleeve 41 and contains one pair of wires 44 connected to the ends of the coil 38 and a further pair of wires 45 connected to the ends of the other coil 39.

When one of the coils is excited with alternating current, a current will be induced in the other coil proportional to the force applied to the core. The angular relation of the coils varies with the permeability characteristic of the core material employed and in this arrangement, the absence of compressive stress on the core induces little or no current. However, when the core is subjected to compressive stress, the permeability is reduced in the direction of the stress and the flux deviates by an amount proportional to the impressed mechanical force. Accordingly, under such conditions, an alternating current signal is generated in the sensing coil which is similarly proportional to the applied stress.

When a load cell of this nature is employed in the force-transducing assembly described, the preloading results, with energization of the cell, in an electrical signal of corresponding strength. As the preload is relieved, for example, by loading of the aircraft, the signal will diminish. In general operation, the system as used to weigh the illustrative aircraft develops two such proportional signals from each of the main landing gear assemblies and a further signal from the nose wheel assembly. The changes in the five signals are totaled and compared with a reference, and a measurement of the total weight of the aircraft is thereby obtained; with a properly calibrated system, the total weight can be directly computed and indicated. As is understood, the center of gravity of the aircraft is given as a percent of the mean aerodynamic chord. Since the landing gear is in a fixed relationship to such chord, it is only necessary to determine the center of gravity with respect to the main gear, and this is accomplished by multiplying the weight of the nose landing gear by a constant which represents the distance between the main gear and the nose wheel. This product, divided by the gross weight, results in a measurement of the center of gravity from the main gear in the direct relation of the center of gravity with respect to the main aerodynamic chord. Accordingly, if the signal change in the nose wheel transducer assembly is compared to the total output from all five weight-sensors, a properly calibrated instrument can compute the center of gravity of the aircraft directly.

With more particular regard to the manner in which such system operation can be accomplished, the diagram of FIG. 8 shows schematically the load cells of the transducer assemblies 13a and 13b of each main gear as having input coils 38 and output coils 39 connected by leads to two terminal strips representative of the cable connectors 17 respectively associated with such gear. The nose wheel transducer assembly 13c is also shown as having an input coil 38 and output coil 39 with a terminal strip representing the connector 22. The cables 5 and 6 are indicated in dashed lines, and it will be assumed that such cable connections have been made whereby the terminals A–D at the landing gear are respectively connected with terminals A′–D′ of the console 4, in the illustrated order. A high-frequency oscillator 46 for example, generating an excitation current alternating at 2000 cycles per second, delivers such current to the several input coils 38 by means of supply wires 47 to which all of these coils are connected, through the paired terminal A, A′ and B, B′, in parallel. The output coils 39 are connected through paired terminals C, C′ and D, D′ to amplifiers 48a–48e and bridge and full wave rectifiers 49a–49e, respectively, with the thus amplified and rectified signals appearing at series connected output resistances 50a—50e. This last series circuit is shown as extending from a ground 51 to one terminal of a galvanometer 52. The other terminal of the galvanometer is connected with the movable contact 53 of a balancing potentiometer 54; the latter has a reference voltage applied thereto from the oscillator 46 through a rectifier 55.

The reference signal from rectifier 55 is also applied to a second balancing potentiometer 56, the movable contact of which is mechanically coupled to the arm 53 of the potentiometer 54. Accordingly, when the latter is balanced, the voltage at the potentiometer 56 is equivalent to the sum of the output voltages. This total output signal from the second potentiometer 56 is applied to a third potentiometer 57 which is balanced against the output at 50e from the nose gear transducer by a galvanometer 58.

The contact 53 of potentiometer 54 is connected for movement and hence adjustment by a manually operated digital counter 59, whereby the gross weight can be taken from this counter upon balancing of the galvanometer 52 circuit. A similar counter 60 is used to actuate the potentiometer 57 to indicate the center of gravity as a percent of the mean aerodynamic chord as earlier explained upon balance of the galvanometer 58.

It will thus be seen that this new system can be operated with relatively simple and highly flexible ground-based equipment. The circuits described could, for example, be incorporated in an easily portable case, with a self-contained battery power supply, with only adjustment of the potentiometer knobs required for display of the gross weight and center of gravity; printed records could be made if desired. In this use, the console or computer would house the extension cords or cables, the unit would be taken to the flight line, and the cables plugged into the connectors of the sensing assemblies permanently installed in the landing gear. The basic computer can be provided with pre-calibrated plug type compensators to facilitate set-up for different types of aircraft by eliminating manual recalibration upon such change.

It will be appreciated that the system is readily adaptable to suit all varieties of aircraft, requiring only that the transducer assembly is positively seated on the inside diameter of a landing gear axle, bogie pivot pin, etc. As indicated above, the same ground-based equipment would be used with appropriate calibration for the particular type and configuration of the aircraft. By using the noted location for the sensors, modification of existing landing gear structural members is held to a minimum and, furthermore, excellent enviromental protection is provided for the sensing assemblies. These last can employ, with the same mounting described, different transducing components providing that the requisite ruggedness and accuracy exist, with a further example being a solid-state sensing element similarly capable of delivering an electrical signal proportional to imposed load.

Other modes of applying the principle of the invention may be employed, change being made as regards the details described, provided the features in any of the following claims or the equivalent of such be employed.

We therefore, particularly point out and distinctly claim as our invention:

1. A force sensing device for sensing forces within a cylindrical member, comprising body means, expansible means for adjustably mounting and locking said body means within said cylindrical member, the latter being normally subjected to deflection-inducing force, transducer mounting means supported by said body means in force transmitting engagement therewith, transducer means carried by said transducer mounting means for proportionally translating force exerted thereon through said cylindrical member and said body means into an electric parameter, and means for adjustably applying a predetermined preload to said transducer means, with such preload being applied in such a direction that the force on said body means during use tends to relieve the preloading in proportion to said force.

2. A force sensing device comprising a cradle body member, walls of said body member defining a cavity therewithin, transducer means mounted in said cavity capable of proportionally translating force exerted thereon into an electric parameter, means for applying force adjustably to said transducer means for predetermined preloading of the same, adjustable extension means at one end of said cradle body member, and a pair of reversely curved spring arms at the other end of the body member, said spring arms and said adjustable extension means cooperating for mounting of the cradle body member diametrically within an annular structural member, so that loading of said structural member proportionally relieves the preload on the transducer means.

3. A force sensing device comprising a cradle body member, walls of said body member defining a cavity therewithin, a pair of lever arms in spaced opposition within said cavity and respectively bearing against walls of the latter, transducer means disposed between corresponding ends of said lever arms, the transducer means being capable of translating force exerted thereon into a proportional electric parameter, adjustable spreader means between the other ends of the lever arms, the latter being fulcrumed at their engagements with the cavity walls, whereby actuation of the spreader means serves to impose a predetermined preload on the transducer means, and means for mounting said cradle body member for subjection to externally applied force which proportionally relieves the preload on the transducer means.

4. A force sensing device comprising a cradle body member, walls of said body member defining a cavity therewithin, a pair of lever arms in spaced opposition within said cavity and respectively bearing against walls of the latter, transducer means disposed between corresponding ends of said lever arms, the transducer means being capable of translating force exerted thereon into a proportional electric parameter, adjustable spreader means between the other ends of the lever arms, the latter being fulcrumed at their engagements with the cavity walls, whereby actuation of the spreader means serves to impose a predetermined preload on the transducer means, and adjustable extension means on said cradle body member adapted to tightly engage an annular structural member and lock said cradle body member therewithin whereby force transmitted to the cradle body member therethrough proportionally relieves the preload on the transducer means.

5. A force sensing device comprising a cradle body member, walls of said body member defining a cavity therewithin, a pair of lever arms in spaced opposition within said cavity and respectively bearing against walls of the latter, transducer means disposed between corresponding ends of said lever arms, the transducer means being capable of translating force exerted thereon into a proportional electric parameter, adjustable spreader means between the other ends of the lever arms, the latter being fulcrumed at their engagements with the cavity walls, whereby actuation of the spreader means serves to impose a predetermined preload on the transducer means, adjustable extension means at one end of the cradle body member, and a pair of reversely curved spring arms at the other end of the member, said spring arms and said adjustable extension means being provided for mounting of the cradle body member diametrically within an annular structural member, so that force on said structural member proportionally relieves the preload on the transducer means.

6. A force sensing device as set forth in claim 5 wherein the cavity walls against which the lever arms bear are outwardly bowed.

7. In combination with an aircraft landing gear including a hollow transverse wheel-supporting member, a weight-sensing assembly permanently installed within said hollow member, said assembly comprising a cradle body extending diametrically of the member and adjustably locked therein, transducer means mounted in a cavity of the cradle body, said transducer means being operable when electrically energized to provide an output electric signal proportional to force exerted thereon, and excitation and signal measuring means adapted for connection to the transducer means, the signal measurement by the last-named means providing an indication of the aircraft weight on the gear.

8. In combination with an aircraft landing gear including a hollow transverse wheel-supporting member, a weight-sensing assembly permanently installed within said hollow member, said assembly comprising a cradle body extending diametrically of the member, transducer means mounted in a cavity of the cradle body, said transducer means being operable when electrically energized to provide an output electric signal proportional to force exerted thereon, means for applying a predetermined preload to the transducer means in such manner that the preload is relieved by force applied thereto as a result of load on the gear member transmitted through the cradle body, and excitation and signal measuring means adapted for connection to the transducer means, the signal measurement by the last-named means providing an indication of the aircraft weight on the gear.

9. In combination with an aircraft landing gear including a hollow transverse wheel-supporting member, a weight-sensing assembly permanently installed within said hollow member, said assembly comprising a mount including a cradle body, reversely curved spring arms at one end of said body bearing against the wall of the hollow landing gear member, adjustable extension means at the other end of the cradle body, said spring arms and said adjustable extension means serving to position and lock the mount in place with the cradle body diametrically disposed, transducer means mounted within a cavity formed therefor in the cradle body, said transducer means being operable when electrically energized to provide an output electric signal in proportion to compressive stress in the cradle body and hence load on the landing gear member, and excitation and signal measuring means adapted for connection to the transducer means, the signal measurement by the last-named means providing an indication of the aircraft weight on the landing gear.

10. In combination with an aircraft landing gear including a hollow transverse wheel-supporting member, a weight-sensing assembly permanently installed within said hollow member, said assembly comprising a mount including a cradle body, reversely curved spring arms at one end of said body bearing against the wall of the hollow landing gear member, adjustable extension means at the other end of the cradle body, said spring arms and said adjustable extension means serving to position and lock the mount in place with the cradle body diametrically disposed, transducer means mounted within a cavity formed therefor in the cradle body, said transducer means being operable when electrically energized to provide an output electric signal proportional to force exerted thereon, means for applying a predetermined preload to the transducer means in such manner that the preload is relieved by force applied thereto as a result of load on the landing gear member transmitted through the cradle body, and excitation and signal measuring means adapted for connection to the transducer means, the signal measurement by the last-named means providing an indication of the aircraft weight on the landing gear.

11. The combination set forth in claim 10 wherein the means for applying the predetermined preload to the transducer means comprises a pair of opposed lever arms within the cradle body cavity, the transducer means being disposed between corresponding ends of said arms and the latter intermediately in pivot bearing against the cavity walls, and adjustable spreader means between the other ends of said lever arms.

12. The combination set forth in claim 11 wherein the walls of the cradle cavity engaged by the lever arms are bowed outwardly.

13. A system for determining the weight of an aircraft having plural landing gear assemblies and hollow cylindrical members therein which together transmit the entire weight of the aircraft, comprising a weight-sensing device permanently installed within each such hollow cylindrical member, each said device including a body extending diametrically across the surrounding cylindrical member and adjustably locked therein transducer means carried by each body operable upon being electrically energized to provide an output electric signal proportional to the weight on the associated landing gear member, and circuit means connectible with the several weight-sensing devices for energizing the transducer means thereof, and circuit means further including means for measuring the output signals from the transducer means.

14. A system set forth in claim 13 wherein the transducer means of the weight-sensing devices are preloaded in such manner that external loading of the devices in use relieves such preloading thereof.

References Cited by the Examiner

UNITED STATES PATENTS

| 2,453,607 | 11/48 | Wardle et al. | 73—65 |
| 2,540,807 | 2/51 | Berry | 73—65 |
| 2,710,942 | 6/55 | Emerson | 73—65 |
| 2,759,356 | 8/56 | Blackmon et al. | 73—65 |
| 2,895,332 | 7/59 | Dahle et al. | 73—141 |
| 3,033,495 | 5/62 | Sikora | 73—141 |

FOREIGN PATENTS

| 139,070 | 10/50 | Australia. |

RICHARD C. QUEISSER, *Primary Examiner.*

ROBERT L. EVANS, JOSEPH P. STRIZAK, *Examiners.*